(12) United States Patent
Ishinoda et al.

(10) Patent No.: US 11,643,071 B2
(45) Date of Patent: May 9, 2023

(54) PARKING ASSISTANCE DEVICE AND PARKING ASSISTANCE METHOD

(71) Applicant: Faurecia Clarion Electronics Co., Ltd., Saitama (JP)

(72) Inventors: Makoto Ishinoda, Saitama (JP); Koki Yamazaki, Saitama (JP)

(73) Assignee: Faurecia Clarion Electronics Co., Ltd., Saitama (JP)

( * ) Notice: Subject to any disclaimer, the term of this patent is extended or adjusted under 35 U.S.C. 154(b) by 17 days.

(21) Appl. No.: 17/536,250

(22) Filed: Nov. 29, 2021

(65) Prior Publication Data

US 2022/0169240 A1 Jun. 2, 2022

(30) Foreign Application Priority Data

Dec. 2, 2020 (JP) .............................. JP2020-200152

(51) Int. Cl.
*H04N 5/44* (2011.01)
*B60W 30/06* (2006.01)
*B62D 15/02* (2006.01)
*B60Q 9/00* (2006.01)
*G06V 20/58* (2022.01)

(52) U.S. Cl.
CPC ............. *B60W 30/06* (2013.01); *B60Q 9/008* (2013.01); *B62D 15/027* (2013.01); *G06V 20/58* (2022.01); *B60W 2420/42* (2013.01); *B60W 2554/4041* (2020.02)

(58) Field of Classification Search
CPC ............. B60W 30/06; B60W 2420/42; B60W 2554/4041; B60W 10/04; B60W 10/10; B60W 10/18; B60W 10/20; B60W 50/14; B60W 2050/146; B60W 2710/10; B60W 2710/18; B60W 2710/20; B60Q 9/008; B62D 15/027; B62D 15/028; B62D 15/0285; G06V 20/58
See application file for complete search history.

(56) References Cited

U.S. PATENT DOCUMENTS

| | | | |
|---|---|---|---|
| 10,025,997 B2* | 7/2018 | Han ..................... | B62D 15/0285 |
| 2014/0129091 A1* | 5/2014 | Yamazaki ............ | B62D 5/0496 |
| | | | 701/42 |
| 2016/0313731 A1* | 10/2016 | Leppänen .......... | B62D 15/0265 |

(Continued)

FOREIGN PATENT DOCUMENTS

JP 2018-180909 A 11/2018

*Primary Examiner* — Munear T Akki
(74) *Attorney, Agent, or Firm* — IP Business Solutions, LLC

(57) ABSTRACT

A parking assistance device includes a range setting unit configured to set a search range searching for an obstacle based on a movement range of a host vehicle for a case in which the host vehicle is moved along a parking route, in terms of two directions, and a judgment unit configured to detect an object having a possibility of interfering with the movement of the host vehicle, based on the surrounding condition around the host vehicle, in a case in which the detected object is positioned within the search range, to judge whether the detected object is an obstacle interfering with the movement of the host vehicle along the parking route, and, in a case in which the detected object is positioned outside the search range, not to make judgment whether the detected object is the obstacle.

6 Claims, 15 Drawing Sheets

(56) References Cited

U.S. PATENT DOCUMENTS

| | | | |
|---|---|---|---|
| 2017/0072947 A1* | 3/2017 | Lavoie | B60W 30/18027 |
| 2017/0144656 A1* | 5/2017 | Kim | B62D 15/0285 |
| 2018/0281680 A1* | 10/2018 | Gerardo Castro | G06N 7/005 |
| 2019/0009773 A1* | 1/2019 | Miyahara | B62D 15/028 |
| 2020/0104613 A1* | 4/2020 | Hirai | G08G 1/143 |
| 2020/0114820 A1 | 4/2020 | Ito | |
| 2020/0401127 A1* | 12/2020 | Kramer | G08G 1/144 |
| 2021/0086756 A1* | 3/2021 | Hasejima | B60W 50/14 |
| 2021/0179085 A1* | 6/2021 | Nakada | B60W 30/06 |

* cited by examiner

… (1)

PARKING ASSISTANCE DEVICE AND PARKING ASSISTANCE METHOD

INCORPORATION BY REFERENCE

The present application claims priority under 35 U.S.C. § 119 to Japanese Patent Application No. 2020-200152 filed on Dec. 2, 2020. The content of the application is incorporated herein by reference in its entirety.

BACKGROUND OF THE INVENTION

Field of the Invention

The present invention relates to parking assistance devices and parking assistance methods.

Description of the Related Art

There is a known device that in the case of driving a vehicle automatically, detects obstacles on the travel route and makes notification.

For example, Japanese Patent Laid-Open No. 2018-180909 includes a moving-obstacle detector that detects a moving obstacle in a given monitoring area; a first calculator that calculates an expected moving route of the moving obstacle; a second calculator that calculates an expected moving route of the host vehicle; a setter that sets an alarm area in the monitoring area in accordance with the expected moving route of the host vehicle, the alarm area being for issuing an alarm; an excluder that excludes, from alarming moving obstacles, the moving obstacle unlikely to reach the alarm area, in accordance with the expected moving route of the moving obstacle and the expected moving route of the host vehicle; and an alarm that issues an alarm against the alarming moving obstacles.

SUMMARY OF THE INVENTION

However, if the monitoring area is not set appropriately, obstacles that do not interfere with the travel of the vehicle are also detected, and since it is necessary to predict whether the vehicle will come into contact with or collide with each of the detected obstacles, it causes a problem of increasing the processing load.

An object of the present invention is to provide a parking assistance device and a parking assistance method that require less processing load for obstacle judgment.

To achieve the above object, a parking assistance device according to an aspect of the present invention includes: an input-output interface connected to an external device; a condition obtaining unit configured to obtain a surrounding condition around a vehicle via the input-output interface, the surrounding condition being detected by a detection device; a parking-position determination unit configured to determine a parking position at which the vehicle is to be parked, based on the obtained surrounding condition around the vehicle; a route generation unit configured to generate a parking route along which the vehicle is to be moved to the parking position; a range setting unit configured to calculate a movement range of the vehicle for a case in which the vehicle is moved along the parking route, in terms of a first direction and a second direction orthogonal to the first direction and that sets a search range for searching for an obstacle, based on the calculated movement range in the first direction and the second direction; and a judgment unit configured to detect an object that has a possibility of interfering with the movement of the vehicle, based on the obtained surrounding condition around the vehicle, in a case in which the detected object is positioned within the search range, to judge whether the detected object is an obstacle that interferes with the movement of the vehicle along the parking route, and, in a case in which the detected object is positioned outside the search range, not to make judgment whether the detected object is the obstacle.

The aspect of the present invention makes it possible to reduce the processing load for obstacle judgment.

DETAILED DESCRIPTION OF THE PREFERRED EMBODIMENTS

The following describes embodiments of the present invention with reference to the attached drawings.

First Embodiment

Figure 1:
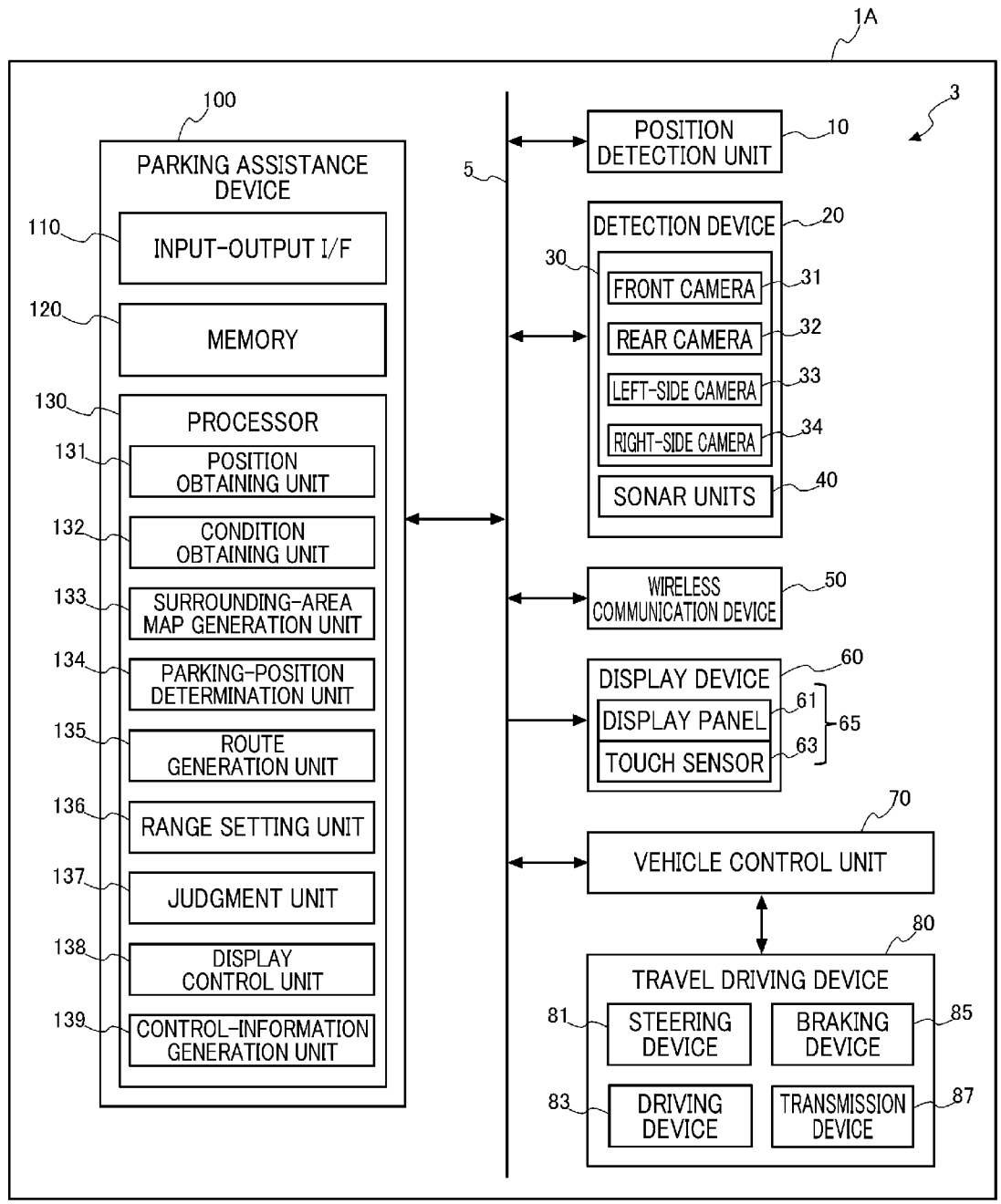
FIG. 1 is a block diagram illustrating the configuration of an in-vehicle device.

FIG. 1 is a diagram illustrating the configuration of an in-vehicle device 3 mounted on a vehicle. In the following, the vehicle on which the in-vehicle device 3 is mounted is referred to as a host vehicle 1A.

The in-vehicle device 3 includes a position detection unit 10, a detection device 20, a wireless communication device 50 (transmitter/receiver, circuit), a display device 60, a vehicle control unit 70, a travel driving device 80, and a parking assistance device 100.

The position detection unit 10 detects the current position of the host vehicle 1A. The position detection unit 10 includes a global navigation satellite system (GNSS) receiver and a processor (both of which are not illustrated). The GNSS receiver receives signals transmitted from satellites. The processor calculates the latitude and longitude, which are position information on the host vehicle 1A, based on the signals received by the GNSS receiver, and the azimuth of the host vehicle 1A from the difference in the calculated position information. The position detection unit 10 outputs the position information and azimuth information on the host vehicle 1A obtained by calculation to the parking assistance device 100.

The detection device 20 includes a plurality of sensors. The detection device 20 of the present embodiment includes, as sensors, sonar units 40 and an image capturing unit 30 including a plurality of cameras.

Although the description in the present embodiment is based on a case in which the detection device 20 includes cameras and sonars, the sensors of the detection device 20 are not limited to cameras and sonars. For example, the detection device 20 may include a radar or a laser imaging detection and ranging (LiDAR) which is capable of measuring the distances to objects using radio waves, light, or the like. The detection device 20 outputs images captured by the image capturing unit 30 and sensor data from the sonar units 40 to the parking assistance device 100, as surrounding-area information indicating surrounding conditions.

The image capturing unit 30 includes a front camera 31 that captures images of the area ahead of the host vehicle 1A, a rear camera 32 that captures images of the area behind the host vehicle 1A, a left-side camera 33 that captures images of the area on the left side of the host vehicle 1A, and a right-side camera 34 that captures images of the area on the right side of the host vehicle 1A. These cameras each include an image sensor such as a charge-coupled device (CCD) or a complementary metal-oxide-semiconductor (CMOS) and a data processing circuit that generates an image from the light receiving state of the image sensor. In the image capturing unit 30, the angles of views of the four cameras are adjusted such that the range of 360 degrees around the host vehicle 1A can be captured by the four cameras. The front camera 31, the rear camera 32, the left-side camera 33, and the right-side camera 34 each capture images of the respective image capturing ranges at a specified frame rate to generate captured images. The front camera 31, the rear camera 32, the left-side camera 33 and the right-side camera 34 output the generated captured images to the parking assistance device 100.

The sonar units 40 are mounted at a plurality of locations such as at the front, rear, right side, left side, and like of the host vehicle 1A and detect objects around the host vehicle 1A using ultrasound. Specifically, the sonar units 40 detect the positions of objects and the distances to the objects.

The wireless communication device 50 follows control by the parking assistance device 100 and performs wireless communication according to a wireless communication standard such as Wi-Fi (registered trademark).

The display device 60 includes a touch panel 65. The touch panel 65 includes a display panel 61 and a touch sensor 63. The display panel 61 employs, for example, a liquid crystal display, an organic EL display, or the like. The touch sensor 63 employs a sensor of a commonly known type, such as a resistive type or a capacitive type. The touch sensor 63 detects touch operations performed on the display panel 61 and generates position signals indicating the operation positions of the detected touch operations. The touch sensor 63 outputs operation information including generated position signals to the parking assistance device 100.

The vehicle control unit 70 is, for example, a computer device such as an electronic control unit (ECU) and is a unit that controls the travel driving device 80 mounted on the host vehicle 1A. The travel driving device 80 includes a steering device 81, a driving device 83, a braking device 85, and a transmission device 87. The vehicle control unit 70 is connected to the steering device 81, the driving device 83, the braking device 85, and the transmission device 87, and the parking assistance device 100 via a communication bus 5 conforming to a standard such as Ethernet (registered trademark), Controller Area Network (CAN), or Local Interconnect Network (LIN). The vehicle control unit 70 controls the steering device 81, the driving device 83, the braking device 85, and the transmission device 87, according to control information inputted from the parking assistance device 100.

The steering device 81 includes an actuator that steers the steering wheel of the host vehicle 1A.

The driving device 83 includes an actuator that adjusts the driving force of the driving wheels of the host vehicle 1A. In the case in which the power source of the host vehicle 1A is an engine, this actuator corresponds to the throttle actuator, and in the case in which the power source is a motor, this actuator corresponds to the motor.

The braking device 85 includes an actuator that controls the brake system provided on the host vehicle 1A based on information from the parking assistance device 100 and controls the braking force applied to the wheels of the host vehicle 1A.

The transmission device 87 includes a transmission and an actuator. The transmission device 87 drives the actuator and controls the shift position of the transmission to switch the gear ratio of the transmission and the forward and backward travel of the host vehicle 1A.

The parking assistance device 100 is a computer device including an input-output interface 110 (CAN transceiver, transceiver), a memory 120, and a processor 130. The parking assistance device 100 may include, in addition to these devices, a storage device such as a hard disk drive (HDD) or a solid state drive (SSD).

The input-output interface 110 is connected to the communication bus 5 and performs data communication with external devices connected to the communication bus 5. The external devices include the position detection unit 10, the detection device 20, the wireless communication device 50, the display device 60, and the vehicle control unit 70.

The memory 120 includes read only memory (ROM) and random access memory (RAM). The memory 120 may be nonvolatile semiconductor memory such as flash memory. The memory 120 stores computer programs executed by the processor 130, data to be processed at the time when the processor 130 executes the computer programs, and data on processing results. The memory 120 also stores images captured by the image capturing unit 30 and sensor data outputted from the sonar units 40.

The processor 130 includes a central processing unit (CPU), a microprocessor unit (MPU), or the like.

The parking assistance device 100 includes, as functional components, a position obtaining unit 131, a condition obtaining unit 132, a surrounding-area map generation unit 133, a parking-position determination unit 134, a route generation unit 135, a range setting unit 136, a judgment unit 137, a display control unit 138, and a control-information generation unit 139. These functional components are the functions implemented by the processor 130 executing computer programs and performing calculation.

The position obtaining unit 131 receives input of the position information and azimuth information on the host vehicle 1A, calculated by the position detection unit 10. The position obtaining unit 131 corrects the position information and azimuth information inputted from the position detection unit 10 by using a well-known dead reckoning method. The position obtaining unit 131 outputs the corrected position information and azimuth information to the surrounding-area map generation unit 133 and the route generation unit 135.

The condition obtaining unit 132 makes the image capturing unit 30 capture images and obtains the captured images generated by the image capturing unit 30 as surrounding-area information. The condition obtaining unit 132 temporarily stores the obtained captured images in the memory 120.

The condition obtaining unit 132 also makes the sonar units 40 execute sensing to obtain sensor data, which is the detection results by the sonar units 40, as surrounding-area information. The condition obtaining unit 132 temporarily stores the obtained sensor data in the memory 120.

The surrounding-area map generation unit 133 generates a surrounding-area map indicating the conditions around the host vehicle 1A based on the position information and azimuth information inputted from the position obtaining unit 131 and the captured images and sensor data stored in the memory 120. Recorded on the surrounding-area map are the positions of and the distances to the objects around the host vehicle 1A, the positions of parking spots indicated by white lines or the like painted on the road surface of a parking lot, and other information. Examples of the objects recorded on the surrounding-area map include other vehicles parked in parking spots and structures in the parking lot such as poles. Hereinafter, these objects are referred to as target objects. Parking spots are marked with lines having a specified thickness, painted on the road surface, and thus the intervals corresponding to the thickness of the white lines are detected as a cyclic feature.

The parking-position determination unit 134 refers to the surrounding-area map generated by the surrounding-area map generation unit 133 and determines a parking spot to park the host vehicle 1A. For example, the parking-position determination unit 134 selects, out of the parking spots recorded on the surrounding-area map, a parking spot in which a target object is not detected and the distance to which from the host vehicle 1A is shorter than or equal to a preset set distance. The parking-position determination unit 134 sets the position and angle of the host vehicle 1A at the time when the host vehicle 1A is parked in the selected parking spot and determines a parking position P.

The route generation unit 135, based on the parking position P determined by the parking-position determination unit 134, generates a plurality of parking routes R1 for parking the host vehicle 1A. A parking route R1 is a route for moving the host vehicle 1A from the current position of the host vehicle 1A to the parking position P. The current position of the host vehicle 1A is the position that the position information obtained by the position obtaining unit 131 indicates. The process of generating the parking routes R1 employs a publicly known method.

The range setting unit 136 calculates the movement range of the host vehicle 1A for the case of moving the host vehicle 1A along the parking route R1. The range setting unit 136 calculates the movement range defined in two directions, an X-axis direction and a Y-axis direction, as the movement range of the host vehicle 1A. The range setting unit 136 calculates the maximum values and the minimum values in the two directions, the X-axis direction and the Y-axis direction, as the movement range. The range setting unit 136 sets a search range W based on the calculated maximum values and minimum values in the two directions. The X axis corresponds to the first direction and is the direction in parallel with the vehicle-width direction of the host vehicle 1A at the time when the host vehicle 1A is at the parking position P. The Y axis corresponds to the second direction and is the direction in parallel with the vehicle-longitudinal direction of the host vehicle 1A at the time when the host vehicle 1A is at the parking position P. Note that it does not mean that the host vehicle 1A is actually parked at the parking position P, but the vehicle-width direction and the vehicle-longitudinal direction of the host vehicle 1A described above are the ones based on the assumption that the host vehicle 1A is moved to the parking position P along a parking route generated by the parking assistance device 100, and that the host vehicle 1A is parked at the parking position P.

Here, the procedure according to which the range setting unit 136 sets a search range W will be described with reference to FIGS. 2 to 9.

Figure 2:
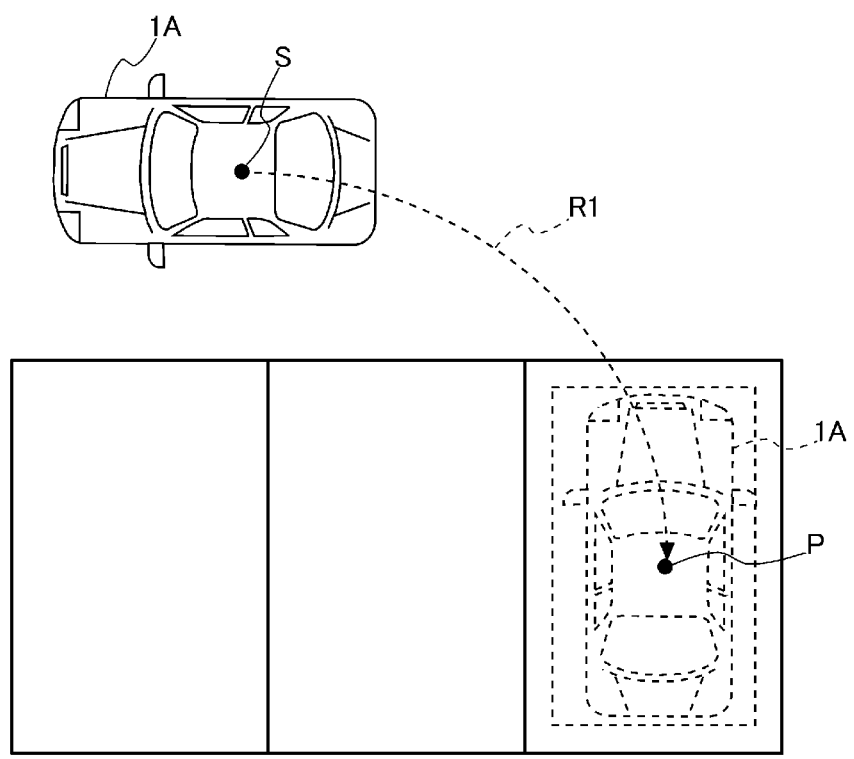
FIG. 2 is a diagram illustrating an example of a parking route.

FIG. 2 is a diagram illustrating an example of a parking route R1. The route indicated by a dashed line in FIG. 2 is the parking route R1. The parking route R1 illustrated in FIG. 2 is a route generated by the route generation unit 135 and is a route for moving the host vehicle 1A from the current position of the host vehicle 1A to the parking position P. Hereinafter, the current position of the host vehicle 1A is referred to as an initial position S.

Figure 3:
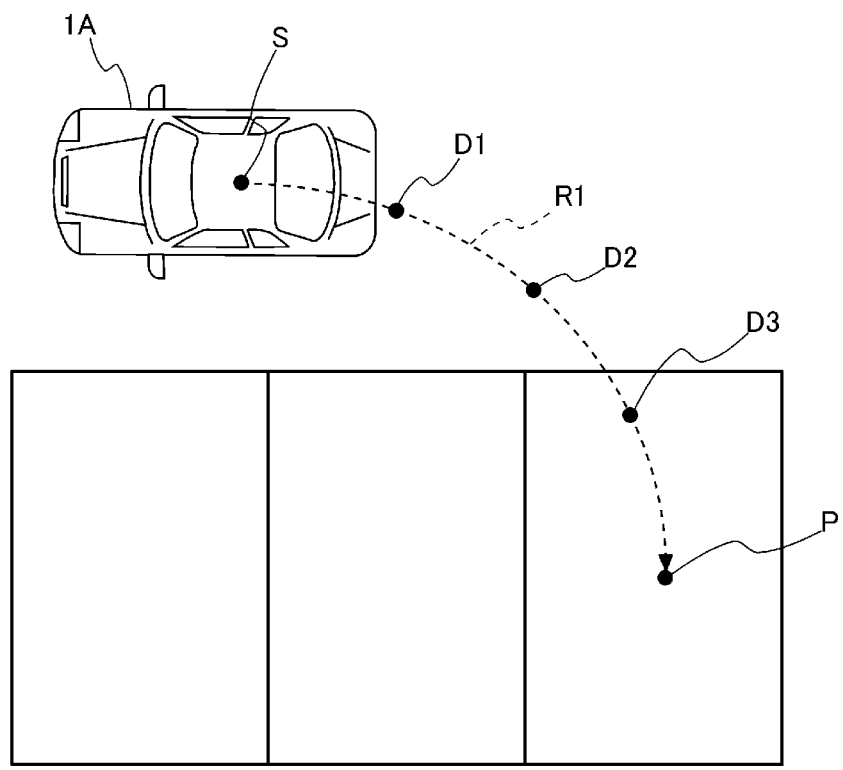
FIG. 3 is a diagram illustrating a plurality of division points set on the parking route.

FIG. 3 is a diagram illustrating a plurality of division points D set on the parking route R1.

When the parking route R1 is generated by the route generation unit 135, the range setting unit 136 sets a plurality of division points D on this parking route R1. The number of division points D set on the parking route R1 may be any number. For example, the range setting unit 136 sets the division points D at intervals of a preset distance. FIG. 3 illustrates an example in which three division points D, which are D1, D2, and D3, are set on the parking route R1.

After setting the plurality of division points D, the range setting unit 136, assuming the case in which the host vehicle 1A is at each of the initial position S, the parking position P, and the division points D1, D2, and D3, calculates the range of the host vehicle 1A at the time when the host vehicle 1A is at each of these positions.

The range setting unit 136 first sets a coordinate system. The range setting unit 136 sets a coordinate system having the origin at the position at which a preset reference position of the host vehicle 1A is positioned when the host vehicle 1A is at the parking position P, the coordinate system also having the X axis along the vehicle-width direction of the host vehicle 1A and the Y axis along the vehicle-longitudinal direction of the host vehicle 1A. The coordinate system thus set is referred to as the parking coordinate system in the following description. The preset reference position of the host vehicle 1A is a position set in advance on the host vehicle 1A, and it may be, for example, the center position in the vehicle-longitudinal direction and the vehicle-width direction or may be the position of the center of gravity of the host vehicle 1A.

Figure 4:
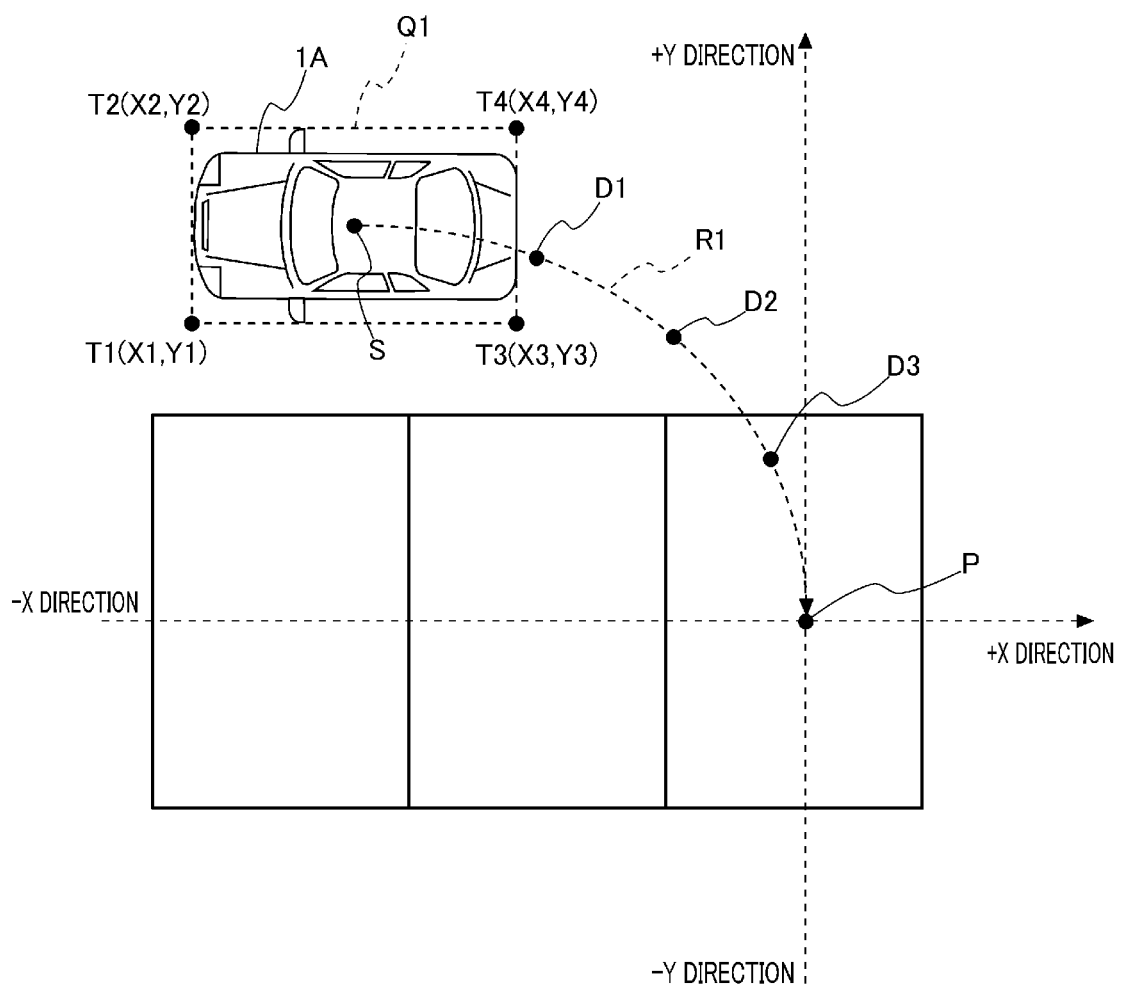
FIG. 4 is a diagram illustrating the range of a host vehicle at the time when the host vehicle is at an initial position.

FIG. 4 is a diagram illustrating the range of the host vehicle 1A at the time when the host vehicle 1A is at the initial position S.

Next, based on the position information and azimuth information on the host vehicle 1A obtained by the position obtaining unit 131, the range setting unit 136 calculates the range of the host vehicle 1A at the time when the host vehicle 1A is at the initial position S, using coordinate values of the parking coordinate system.

A rectangular shape Q1 indicated with dashed lines in FIG. 4 is the shape indicating the range of the host vehicle 1A at the time when the host vehicle 1A is at the initial position S. The length of the rectangular shape Q1 corresponds to the length of the host vehicle 1A in the vehicle-longitudinal direction, and the width of the rectangular shape Q1 corresponds to the length of the host vehicle 1A in the vehicle-width direction including the side mirrors. The range setting unit 136 calculates the coordinates of the four apexes of the rectangular shape Q1 as the range of the host vehicle 1A.

The range setting unit 136 first converts the latitude and the longitude which are the position information obtained by the position obtaining unit 131 into coordinate values of the parking coordinate system. After converting the latitude and the longitude into coordinate values of the parking coordinate system, the position obtaining unit 131 calculates the coordinate values indicating the positions of the four apexes of the rectangular shape Q1 based on the coordinate values of the initial position S obtained by the conversion, the azimuth information on the host vehicle 1A, and preset set values. The preset set values are values for converting the reference position of the host vehicle 1A into the four apexes of the rectangular shape Q1 in the case in which the azimuth angle of the host vehicle 1A is 0 degrees, in other words, in the case in which the host vehicle 1A is oriented to the north, and thus there are four values corresponding to the four apexes of the rectangular shape Q1. Hence, the range setting unit 136 corrects the four preset set values based on the azimuth information on the host vehicle 1A obtained by the position obtaining unit 131.

After correcting the four set values, the range setting unit 136 adds or subtracts the corrected set values to or from the coordinate values of the initial position S and calculates the coordinates of the four apexes of the rectangular shape Q1 at the time when the host vehicle 1A is at the initial position S. The four apexes of the rectangular shape are represented by T1, T2, T3, and T4, and the coordinates of the four apexes calculated by the range setting unit 136 are assumed to be T1 (X1, Y1), T2 (X2, Y2), T3 (X3, Y3), and T4 (X4, Y4).

Figure 5:
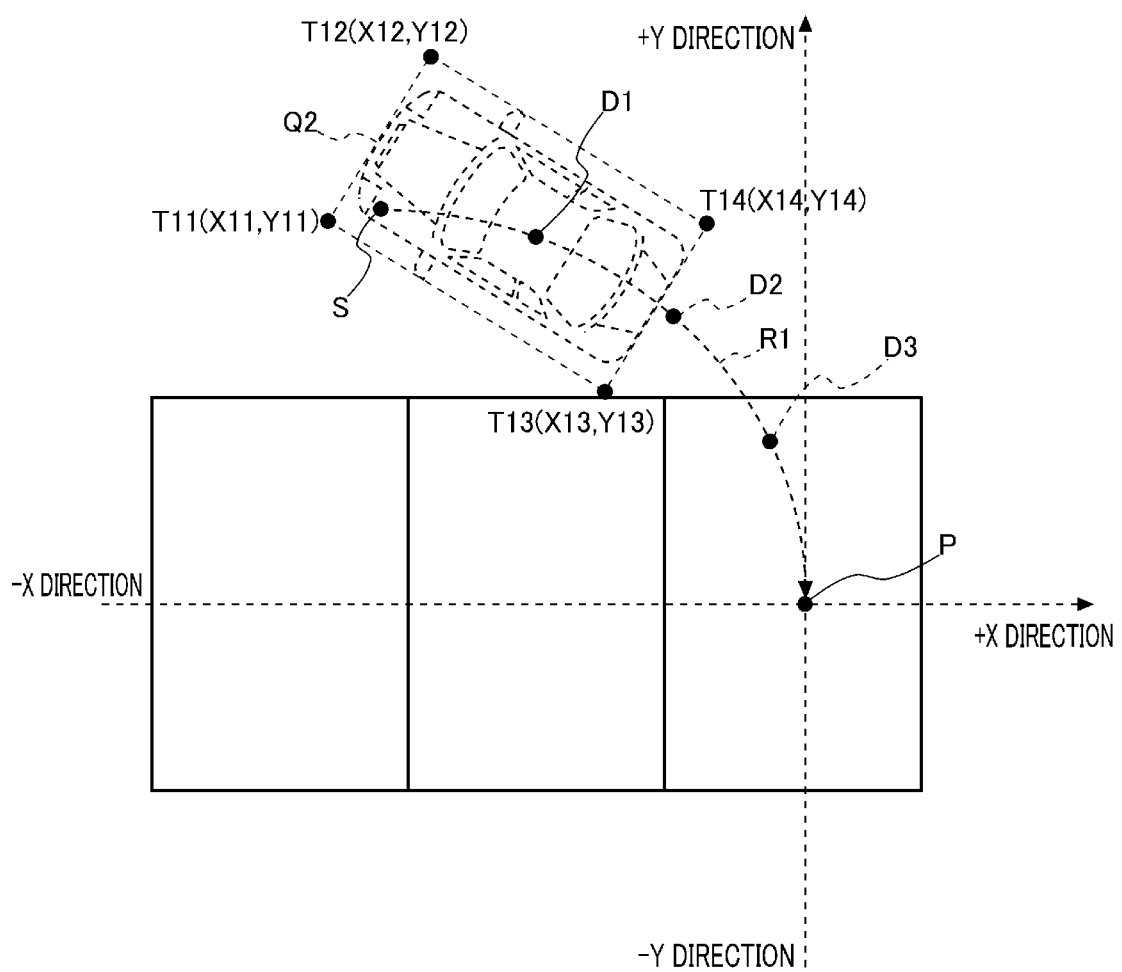
FIG. 5 is a diagram illustrating the range of the host vehicle at the time when the host vehicle is at a division point.
Figure 6:
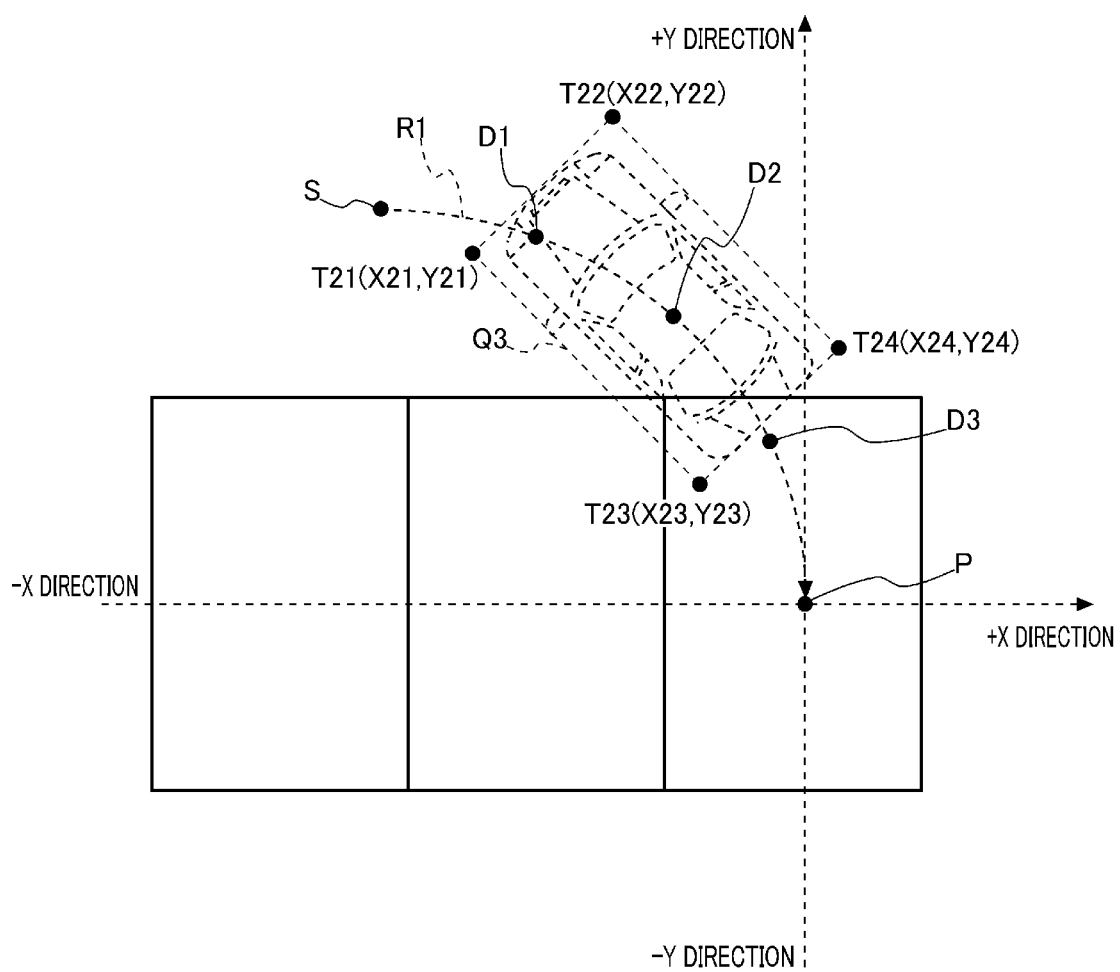
FIG. 6 is a diagram illustrating the range of the host vehicle at the time when the host vehicle is at a division point.

FIG. 5 is a diagram illustrating the range of the host vehicle 1A at the time when the host vehicle 1A is at the division point D1, and FIG. 6 is a diagram illustrating the range of the host vehicle 1A at the time when the host vehicle 1A is at the division point D2.

Figure 7:
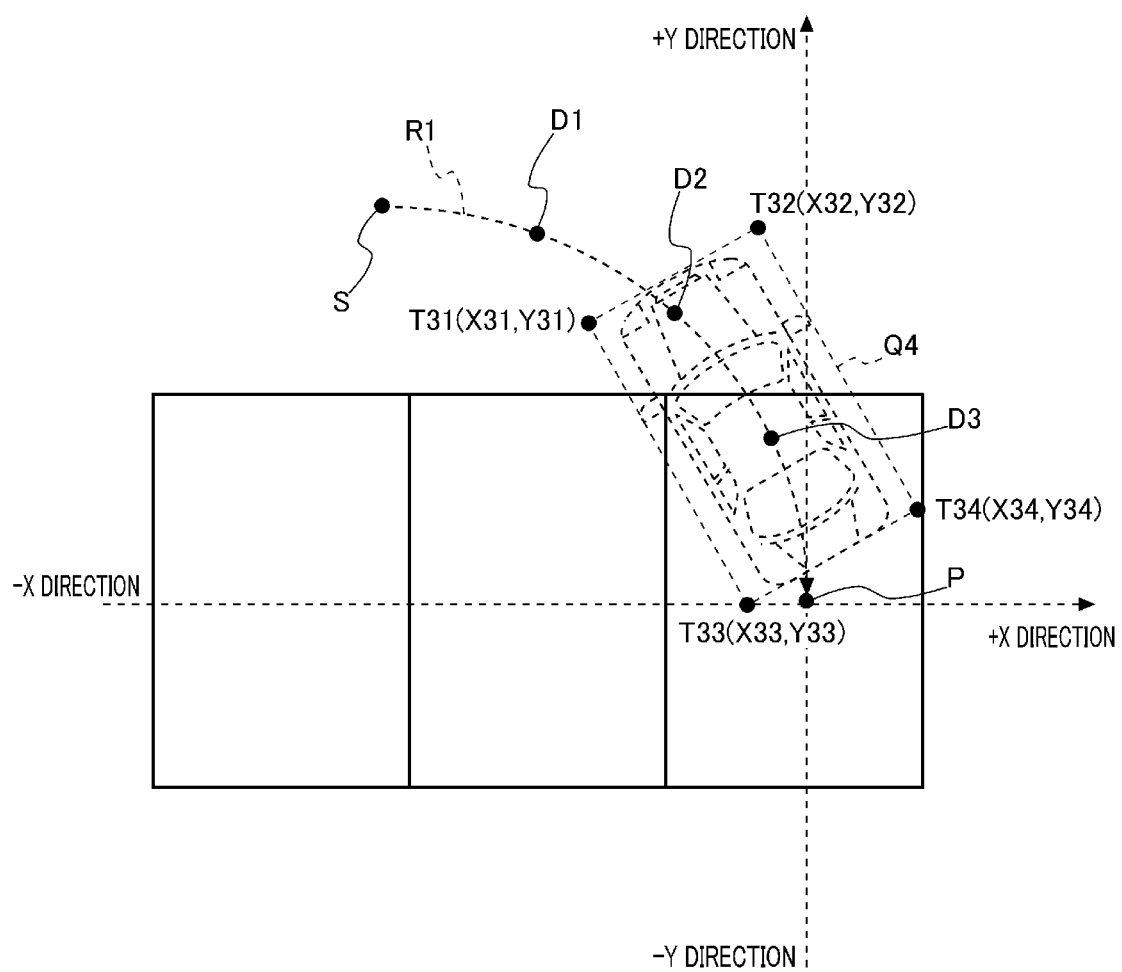
FIG. 7 is a diagram illustrating the range of the host vehicle at the time when the host vehicle is at a division point.
Figure 8:
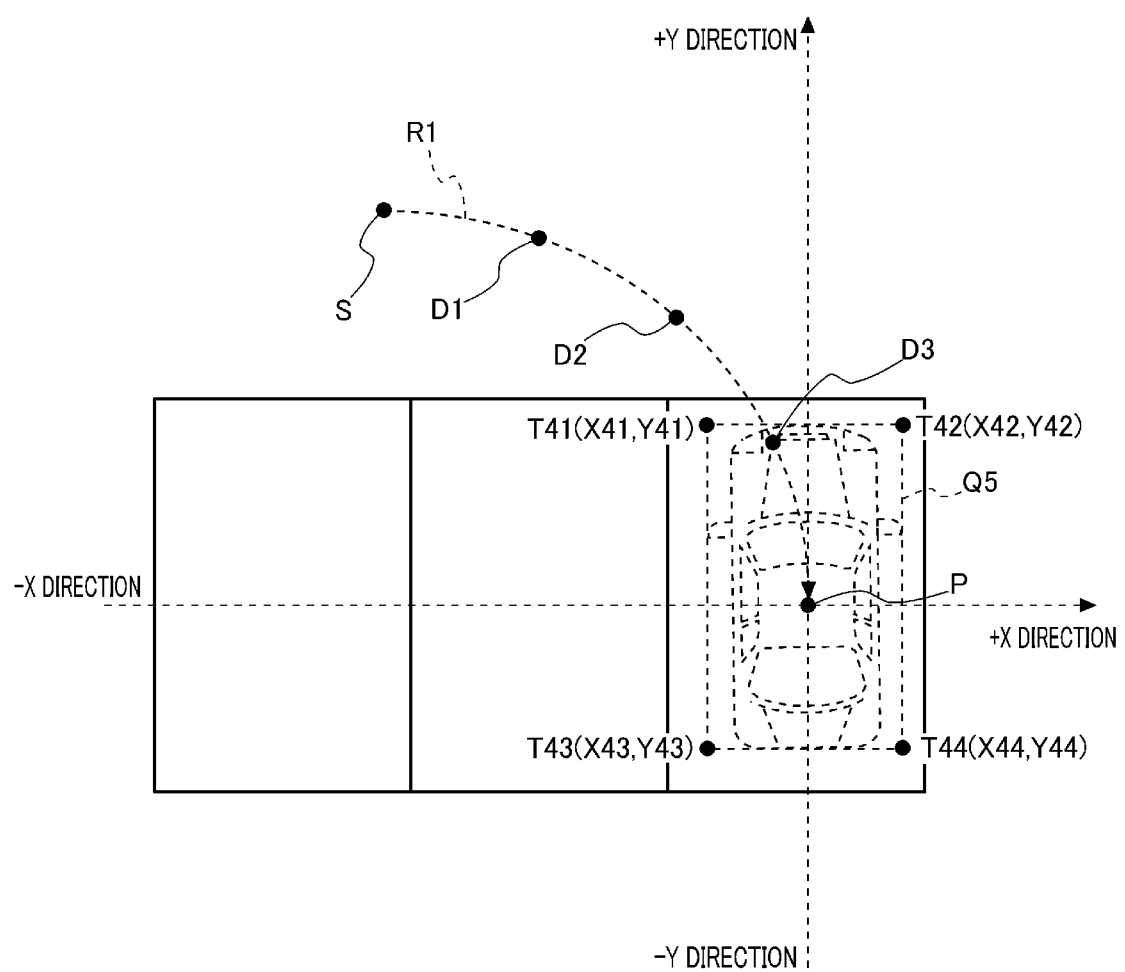
FIG. 8 is a diagram illustrating the range of the host vehicle at the time when the host vehicle is at a parking position.

FIG. 7 is a diagram illustrating the range of the host vehicle 1A at the time when the host vehicle 1A is at the division point D3, and FIG. 8 is a diagram illustrating the range of the host vehicle 1A at the time when the host vehicle 1A is at the parking position P.

The range setting unit 136 calculates the range of the host vehicle 1A at the time when the host vehicle 1A is at each of the division points D1, D2, and D3 and the parking position P in the same way as it calculated the range of the host vehicle 1A at the time when the host vehicle 1A is at the initial position S.

The range setting unit 136 converts the azimuth angle of the host vehicle 1A at the initial position S into the azimuth angle of the host vehicle 1A at the time when the host vehicle 1A is at the division point D1. After that, the range setting unit 136 corrects the four preset set values based on the azimuth angle of the host vehicle 1A obtained by the conversion and calculates the coordinates of the four apexes of the rectangular shape Q2 indicating the range of the host vehicle 1A at the time when the host vehicle 1A is at the division point D1. The four apexes of the rectangular shape Q2 are represented by T11, T12, T13, and T14, and the coordinates of the four apexes calculated by the range setting unit 136 are represented by T11 (X11, Y11), T12 (X12, Y12), T13 (X13, Y13), and T14 (X14, Y14).

After that, the range setting unit 136 calculates, in the same way, the coordinates of the four apexes of each of the rectangular shape Q3 indicating the range of the host vehicle 1A at the time when the host vehicle 1A is at the division point D2, the rectangular shape Q4 indicating the range of the host vehicle 1A at the time when the host vehicle 1A is at the division point D3, and the rectangular shape Q5 indicating the range of the host vehicle 1A at the time when the host vehicle 1A is at the parking position P.

The four apexes of the rectangular shape Q3 are represented by T21, T22, T23, and T24, and the coordinates of the four apexes calculated by the range setting unit 136 are represented by T21 (X21, Y21), T22 (X22, Y22), T23 (X23, Y23), and T24 (X24, Y24).

The four apexes of the rectangular shape Q4 are represented by T31, T32, T33, and T34, and the coordinates of the four apexes calculated by the range setting unit 136 are represented by T31 (X31, Y31), T32 (X32, Y32), T33 (X33, Y33), and T34 (X34, Y34).

The four apexes of the rectangular shape Q5 are represented by T41, T42, T43, and T44, and the coordinates of the four apexes calculated by the range setting unit 136 are represented by T41 (X41, Y41), T42 (X42, Y42), T43 (X43, Y43), and T44 (X44, Y44).

Figure 9:
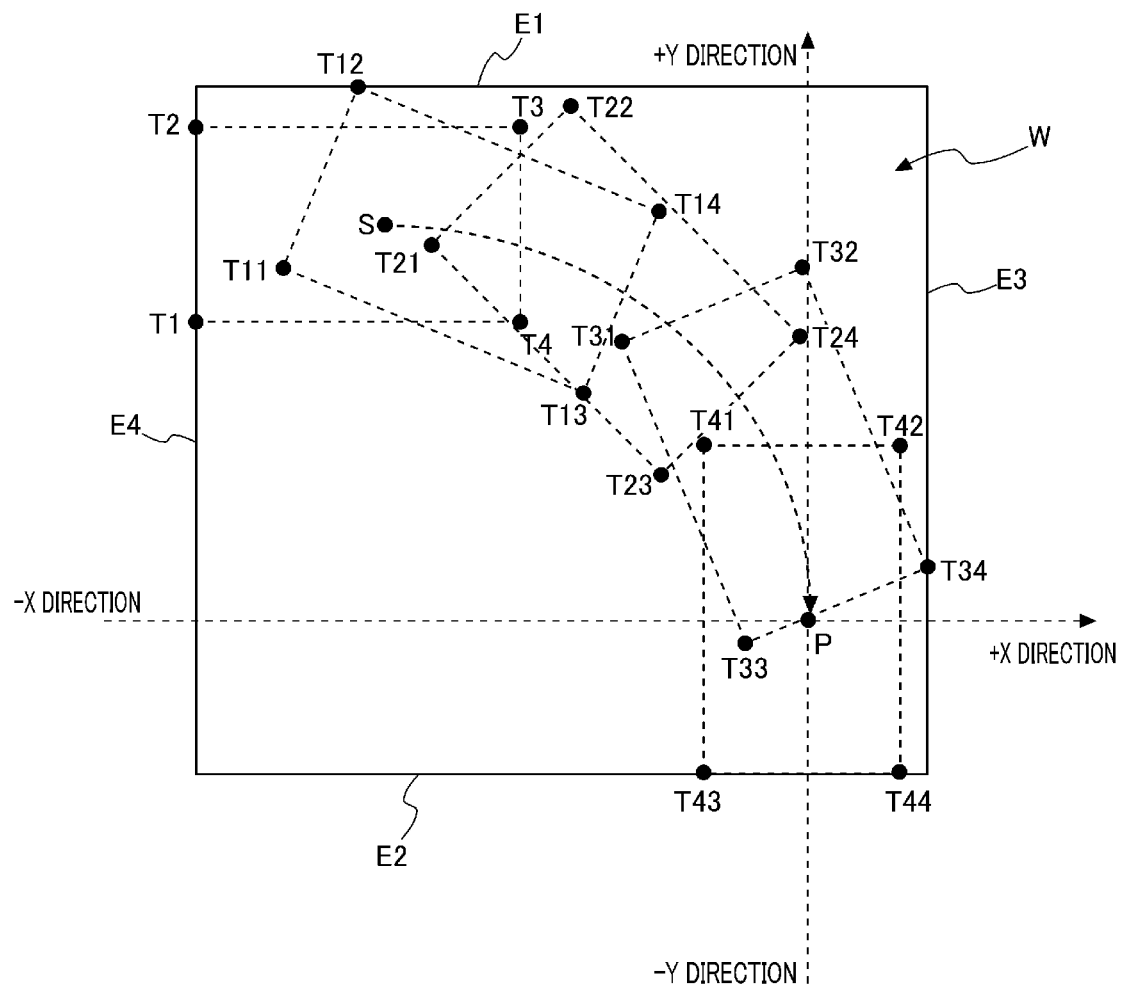
FIG. 9 is a diagram illustrating the coordinates indicating the range of the host vehicle at each of the initial position, the division points, and the parking position.

FIG. 9 is a diagram illustrating the coordinates indicating the range of the host vehicle 1A at each of the initial position S, the division points D1, D2, and D3, and the parking position P.

Next, the range setting unit 136 selects the maximum value and the minimum value of the X coordinate values and the maximum value and the minimum value of the Y coordinate values out of the coordinates indicating the ranges of the host vehicle 1A at the initial position S, the division point D1, the division point D2, the division point D3, and the parking position P.

In the example illustrated in FIG. 9, the maximum value of the X coordinate values is the coordinate value X34 at T34, and the minimum value of the X coordinate values is the coordinate values X1 and X2 at T1 and T2. The maximum value of the Y coordinate values is the coordinate value Y12 at T12, and the minimum value of the Y coordinate values is the coordinate values Y43 and Y44 at T43 and T44. In the following, the maximum value of the X coordinate values is represented by Xmax, and the minimum value is represented by Xmin. The maximum value of the Y coordinate values is represented by Ymax, and the minimum value is represented by Ymin.

The range setting unit 136 sets, as a search range W, the range defined by the selected maximum value Xmax and minimum value Xmin of the X coordinate values and the selected maximum value Ymax and minimum value Ymin of the Y coordinate values. The range setting unit 136 sets, as the search range W, the rectangular range defined by the first and second sides E1 and E2 in parallel with the X axis and the third and fourth sides E3 and E4 in parallel with the Y axis.

The first side E1 has a Y coordinate value of Ymax and is in parallel with the X axis. The second side E2 has a Y coordinate value of Ymin and is in parallel with the X axis. The third side E3 has an X coordinate value of Xmax and is in parallel with the Y axis. The fourth side E4 has an X coordinate value of Xmin and is in parallel with the Y axis.

The judgment unit 137 receives input of information indicating the search range W calculated by the range setting unit 136. The judgment unit 137 reads the surrounding-area information that the condition obtaining unit 132 obtained from the memory 120.

When the host vehicle 1A starts moving along the parking route, the judgment unit 137 detects target objects around the host vehicle 1A based on the read surrounding-area information. Specifically, the judgment unit 137 detects target objects that can be obstacles, based on the images captured by the image capturing unit 30 and the detection results by the sonar units 40. Here, examples of the target objects that the judgment unit 137 detects include not only structures such as walls and poles of the parking lot but also other vehicles, people, and shopping carts.

When the judgment unit 137 detects a target object from the surrounding-area information, the judgment unit 137 judges whether the detected target object is within the search range W.

In the case in which the target object is outside the search range W, the judgment unit 137 does not make judgment whether the target object is an obstacle to the travel of the host vehicle 1A. Specifically, since a target object outside the search range W has no possibility that the host vehicle 1A will collide with it, the judgment unit 137 does not make judgment whether the target object is an obstacle.

In the case in which the target object is within the search range W, the judgment unit 137 judges whether the target object can be an obstacle that the host vehicle 1A will come into contact with or collide with when the host vehicle 1A travels along the parking route R1. The judgment unit 137 repeats this judgment while the host vehicle 1A is traveling along the parking route R1.

In the case in which the judgment unit 137 judges that the host vehicle 1A will come into contact with or collide with the target object, the judgment unit 137 judges that this target object is an obstacle and calculates an avoidance route for avoiding contact or collision with the obstacle and parking the host vehicle 1A at the parking position P. This avoidance route may include part of the parking route R1 that the route generation unit 135 first generated or may be a route totally different from the parking route R1.

The display control unit 138 generates display data that the display device 60 displays and outputs the generated display data to the display device 60. The display device 60 displays display-images based on the inputted display data, on the touch panel 65.

The control-information generation unit 139 receives input of information on the parking route R1, or part of the parking route R1 and the avoidance route, generated by the route generation unit 135. Based on the inputted information on the parking route R1, or part of the parking route R1 and the avoidance route, the control-information generation unit 139 generates control information that the vehicle control unit 70 executes. The control information is information for the vehicle control unit 70 to control the steering device 81, the driving device 83, the braking device 85, and the transmission device 87 so that the host vehicle 1A can travel to the parking position P automatically. The control-information generation unit 139 outputs the generated control information to the vehicle control unit 70 via the input-output interface 110.

Figure 10:
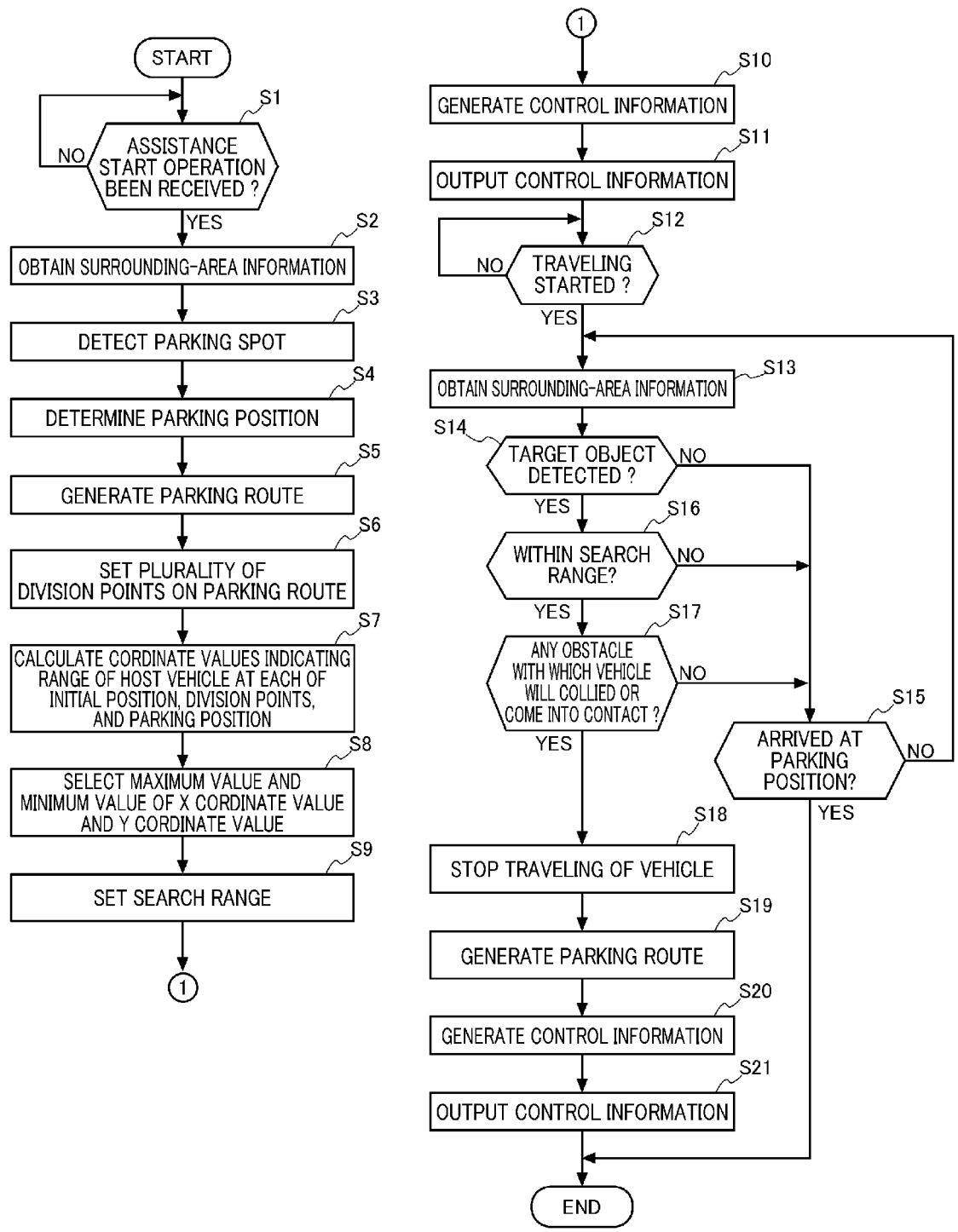
FIG. 10 is a flowchart illustrating the operation of a parking assistance device.

FIG. 10 is a flowchart illustrating the operation of the parking assistance device 100.

The operation of the parking assistance device 100 will be described with reference to the flowchart illustrated in FIG. 10.

First, the parking assistance device 100 judges whether it has received a parking-assistance start operation (step S1). For example, the parking assistance device 100 judges that it has received a start operation when a parking-assistance start button displayed on the touch panel 65 is touched and pressed. If the parking assistance device 100 has not received a parking-assistance start operation (NO at step S1), it keeps waiting to start the next process until it receives a start operation.

If the parking assistance device 100 has received a parking-assistance start operation (YES at step S1), it obtains surrounding-area information, which is information on the surrounding area of the host vehicle 1A, from the detection device 20 (step S2). Step S2 corresponds to the obtaining step. Based on the obtained surrounding-area information, the parking assistance device 100 detects a parking spot in which the host vehicle 1A can be parked (step S3).

The parking assistance device 100 sets, in the detected parking spot, the angle and position of the host vehicle 1A at the time when it is parked and determines a parking position P for parking the host vehicle 1A (step S4). Step S4 corresponds to the determination step. The parking assistance device 100 generates a parking route R1 for moving the host vehicle 1A from the initial position S at which the host vehicle 1A is positioned to the set parking position P (step S5). Step S5 corresponds to the generation step.

Next, the parking assistance device 100 sets a plurality of division points D on the generated parking route R1 (step S6). The parking assistance device 100 sets the division points D at intervals of a preset distance on the parking route R1. After setting the plurality of division points D, the parking assistance device 100, assuming the case in which the host vehicle 1A is at each of the initial position S, the plurality of division points D, and the parking position P, determines the coordinate values of the four apexes of the rectangular shapes Q1 to Q4 each indicating the range of the host vehicle 1A at the time when the host vehicle 1A is at each position (step S7).

Next, the parking assistance device 100 selects the maximum value Xmax and the minimum value Xmin of the X coordinate values and the maximum value Ymax and the minimum value Ymin of the Y coordinate values out of the coordinates of the four apexes of the rectangular shapes Q1 to Q4 at the initial position S, the plurality of division points D, and the parking position P (step S8).

Next, the parking assistance device 100 sets a search range W for searching for obstacles, based on the selected maximum value Xmax and minimum value Xmin of the X coordinate values and the selected maximum value Ymax and minimum value Ymin of the Y coordinate values (step S9). Each of steps S6 to S9 corresponds to the setting step.

Next, the parking assistance device 100 generates control information for making the host vehicle 1A travel along the parking route R1 generated at step S5 (step S10). The parking assistance device 100 outputs the generated control information to the vehicle control unit 70 (step S11). The vehicle control unit 70 controls the steering device 81, the driving device 83, the braking device 85, and the transmission device 87 according to the inputted control information to make the host vehicle 1A travel to the parking position P.

Next, the parking assistance device 100 judges whether the host vehicle 1A has started traveling (step S10). The parking assistance device 100 inquires of the vehicle control unit 70 whether the vehicle control unit 70 has started making the host vehicle 1A travel. If the parking assistance device 100 does not receive a response from the vehicle control unit 70 indicating that the vehicle control unit 70 has started to make the host vehicle 1A travel (NO at step S12), the parking assistance device 100 keeps waiting to start the process. If the host vehicle 1A has started traveling (YES at step S12), the parking assistance device 100 obtains surrounding-area information (step S13) and detects target objects from the obtained surrounding-area information (step S14). Step S14 corresponds to the detection step.

If the parking assistance device 100 cannot detect target objects from the surrounding-area information (NO at step S14), the parking assistance device 100, based on the position information inputted from the position detection unit 10, makes position judgment on the host vehicle 1A whether the host vehicle 1A has arrived at the parking position P (step S15). If the host vehicle 1A has arrived at the parking position P (YES at step S15), the parking assistance device 100 ends this procedure. If the host vehicle 1A has not arrived at the parking position P (NO at step S15), the parking assistance device 100 returns to the process at step S13 and obtains surrounding-area information again.

If the parking assistance device 100 was able to detect a target object from the surrounding-area information (YES at step S14), the parking assistance device 100 judges whether the detected target object is within the search range W (step S16). If the parking assistance device 100 was unable to detect target objects within the search range W (NO at step S16), the parking assistance device 100 moves to the judgment at step S15 and judges whether the host vehicle 1A has arrived at the parking position P.

If the parking assistance device 100 was able to detect a target object within the search range W (YES at step S16), the parking assistance device 100 judges whether this target object is an obstacle with which the host vehicle 1A will collide or come into contact if the host vehicle 1A travels along the parking route R1 (step S17). Steps S16 and S17 correspond to the determination step. If the parking assistance device 100 judges that the target object is not an obstacle with which the host vehicle 1A will collide or come into contact (NO at step S17), the parking assistance device 100 moves to the judgment at step S15 and judges whether the host vehicle 1A has arrived at the parking position P.

If the parking assistance device 100 judges that the detected target object is an obstacle with which the host vehicle 1A will collide or come into contact (YES at step S17), the parking assistance device 100 makes the vehicle control unit 70 stop the traveling of the host vehicle 1A (step S18). After that, the parking assistance device 100 generates an avoidance route that makes it possible to avoid contact or collision with the detected obstacle (step S19).

After generating the avoidance route, the parking assistance device 100 generates control information for making the host vehicle 1A travel according to the generated avoidance route (step S20). After generating the control information, the parking assistance device 100 outputs the generated control information to the vehicle control unit 70 (step S21).

As has been described above, the parking assistance device 100 of the present embodiment calculates the movement range of the host vehicle 1A for the case in which the host vehicle 1A moves along the generated parking route R1, in terms of the two directions, the X axis and Y axis directions orthogonal to each other, and the parking assistance device 100 sets a search range W for searching for obstacles based on the calculated movement range defined in the X axis and Y axis directions.

The parking assistance device 100 then detects objects that can be obstacles to the movement of the host vehicle 1A, and if a detected object is within the search range W, the parking assistance device 100 judges whether the detected object is an obstacle that interferes with the movement of the host vehicle 1A along the parking route R1. If the detected object is outside the search range W, the judgment unit 137 does not make judgment whether the detected object is an obstacle.

Since objects outside the search range W are not judged to be obstacles that interfere with the movement of the host vehicle 1A, it is possible to reduce the processing load for judging whether detected objects are obstacles to the vehicle.

In addition, since the search range W is set based on the movement range of the host vehicle 1A defined in the X-axis direction and the Y-axis direction, it is possible to set a search range W easily, making it possible to set an optimum search range W for objects that interfere with the movement along the parking route R1.

The range setting unit 136 sets, as the X axis, the vehicle-width direction of the host vehicle 1A at the time when the host vehicle 1A is parked at the parking position P and sets, as the Y axis, the vehicle-longitudinal direction of the host vehicle 1A in the same state. The range setting unit 136 sets, as a search range W, a rectangular range defined by the movement range of the host vehicle 1A in the X-axis direction and the movement range of the host vehicle 1A in the Y-axis direction.

This makes it easy to set a search range W, and it also makes it possible to set a further optimum search range W for searching for objects that interfere with the movement along the parking route R1.

The range setting unit 136 sets a plurality of division points D at intervals of a specified distance on the parking route R1. The range setting unit 136, assuming the case in which the vehicle is at each of the current position of the host vehicle 1A, the plurality of set division points D, and the parking position, calculates the coordinate values indicating the range of the vehicle at each point, in terms of the X-axis direction and the Y-axis direction. The range setting unit 136 sets a search range W based on the maximum value and the minimum value of the coordinates in the X-axis direction and the maximum value and the minimum value of the coordinates in the Y-axis direction, out of the coordinate values calculated at all the positions.

Thus, since the positions at which the position of the host vehicle 1A is calculated are limited to the current position of the host vehicle 1A, the positions of the division points D, and the parking position, it is possible to reduce the processing load for calculating the movement range of the host vehicle 1A defined in the X-axis direction and the Y-axis direction.

In the case in which the judgment unit 137 judges that an object is an obstacle that interferes with the movement of the host vehicle 1A along the parking route R1, the route generation unit 135 generates again a parking route R1 for moving the host vehicle 1A to the parking position P while avoiding the host vehicle 1A coming into contact with the obstacle.

Thus, it is possible to make the host vehicle 1A travel along the parking route that makes it possible to avoid contact with the detected obstacle, and park the host vehicle 1A at the parking position P.

Modification Example

The foregoing embodiment was described based on the case in which the mode of parking at the parking position P selected by the parking assistance device 100 is perpendicular parking. The parking mode of the parking lot where the host vehicle 1A is to be parked is not limited to perpendicular parking, but it may be parallel parking or angle parking.

Parallel parking is a parking mode of parking the host vehicle 1A such that the host vehicle 1A and other vehicles are aligned along the vehicle-longitudinal direction of the host vehicle 1A. Angle parking is a parking mode of parking in one of the parking spots provided to be angled to a pathway in front of or behind the parking spots.

Figure 11:
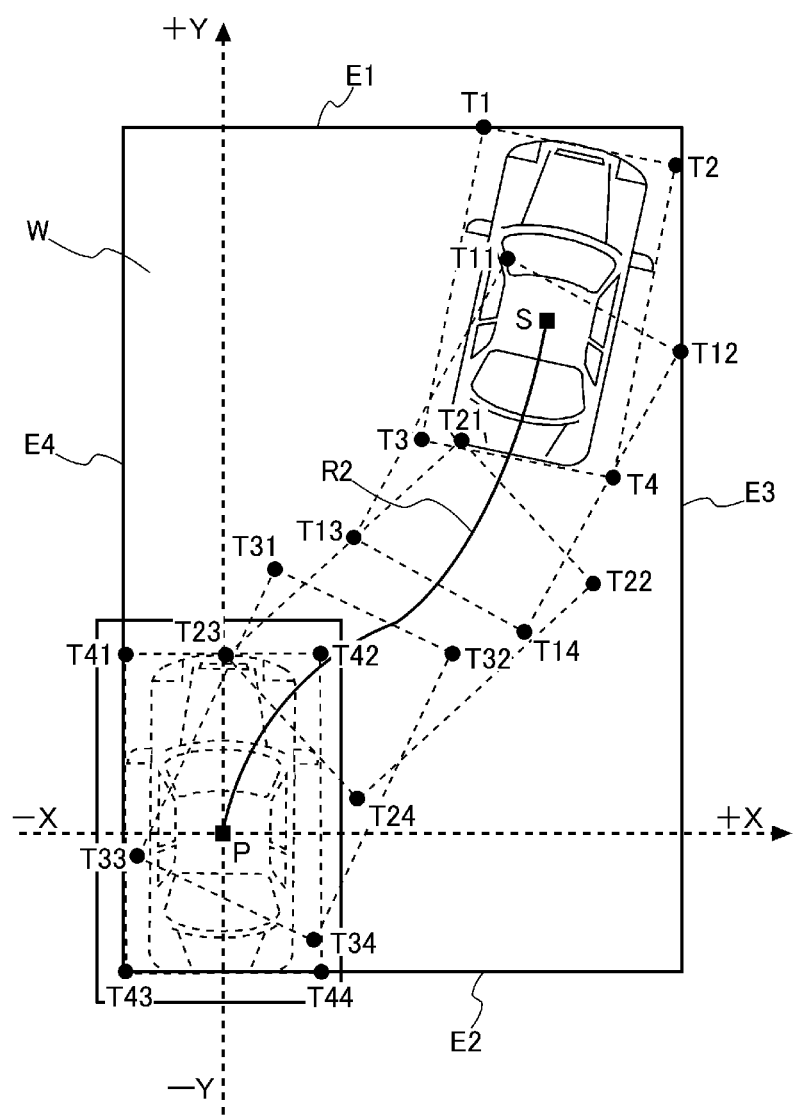
FIG. 11 is a diagram illustrating a search range for the case in which the parking mode is parallel parking.

FIG. 11 is a diagram illustrating a search range W for the case in which the parking mode is parallel parking.

The curved line R2 indicated by a solid line in FIG. 11 indicates a parking route R2 generated by the parking assistance device 100 in the case of parallel parking. FIG. 11 shows the coordinates of the four apexes of the rectangular shape indicating the range of the host vehicle 1A at each of the initial position S which is the current position of the host vehicle 1A, three division points D1, D2, and D3, and the parking position P.

As in the case described with reference to FIGS. 4 to 8, the four apexes of the rectangular shape at the time when the host vehicle 1A is at the initial position S are represented by T1 (X1, Y1), T2 (X2, Y2), T3 (X3, Y3), and T4 (X4, Y4), and the four apexes of the rectangular shape at the time when the host vehicle 1A is at the division point D1 are represented by T11 (X11, Y11), T12 (X12, Y12), T13 (X13, Y13), and T14 (X14, Y14). The four apexes of the rectangular shape at the time when the host vehicle 1A is at the division point D2 are represented by T21 (X21, Y21), T22 (X22, Y22), T23 (X23, Y23), and T24 (X24, Y24), and the four apexes of the rectangular shape at the time when the host vehicle 1A is at the division point D3 are represented by T31 (X31, Y31), T32 (X32, Y32), T33 (X33, Y33), and T34 (X34, Y34). The four apexes of the rectangular shape at the time when the host vehicle 1A is at the parking position P are represented by T41 (X41, Y41), T42 (X42, Y42), T43 (X43, Y43), and T44 (X44, Y44).

In the same way as in perpendicular parking, the parking assistance device 100 selects the maximum value Xmax and the minimum value Xmin of the X coordinate values and the maximum value Ymax and the minimum value Ymin of the Y coordinate values.

In the example illustrated in FIG. 11, the maximum value of the X coordinate values is the coordinate value X12 at T12, and the minimum value of the X coordinate values is the coordinate values X41 and X43 at T41 and T43. The maximum value of the Y coordinate values is the coordinate value Y1 at T1, and the minimum value of the Y coordinate values is the coordinate values Y43 and Y44 at T43 and T44.

After selecting the maximum value Xmax and the minimum value Xmin of the X coordinate values and the maximum value Ymax and the minimum value Ymin of the Y coordinate values, the parking assistance device 100 sets a search range W based on the selected four coordinate values. As illustrated in FIG. 11, the search range W is a rectangular range defined by the four sides: E1, E2, E3, and E4.

E1 is a line segment that is in parallel with the X axis and the intersection point of which with the Y axis has a Y coordinate value of Y11.

E2 is a line segment that is in parallel with the X axis and the intersection point of which with the Y axis has a Y coordinate value of Y43 or Y44.

E3 is a line segment that is in parallel with the Y axis and the intersection point of which with the X axis has an X coordinate value of X12.

E4 is a line segment that is in parallel with the Y axis and the intersection point of which with the X axis has an X coordinate value of X41 or X43.

Figure 12:
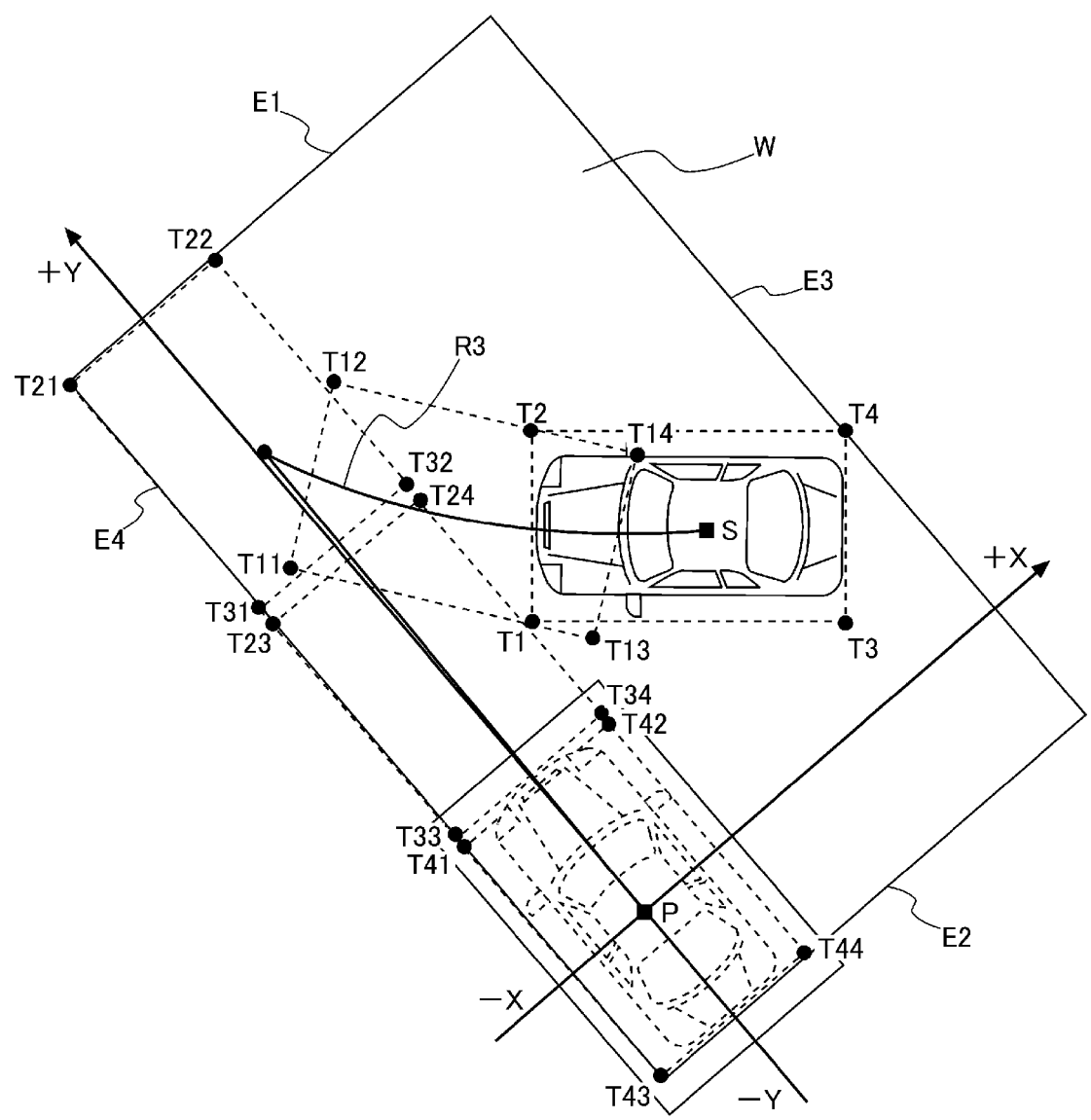
FIG. 12 is a diagram illustrating a search range for the case in which the parking mode is angle parking.

FIG. 12 is a diagram illustrating a search range W for the case in which the parking mode is angle parking.

The curved line R3 indicated by a solid line in FIG. 12 indicates a parking route R3 generated by the parking assistance device 100 in a case of angle parking. FIG. 12 shows the coordinates of the four apexes of the rectangular shape indicating the range of the host vehicle 1A at each of the initial position S which is the current position of the host vehicle 1A, three points D1, D2, and D3, and the parking position P.

The coordinate values of the four apexes of the rectangular shape at each position are represented in the same way as in the case described with reference to FIG. 11.

In the same way as in parallel parking, the parking assistance device 100 selects the maximum value Xmax and the minimum value Xmin of the X coordinate values and the maximum value Ymax and the minimum value Ymin of the Y coordinate values.

In the example illustrated in FIG. 12, the maximum value of the X coordinate values is the coordinate value X4 at T4, and the minimum value of the X coordinate values is the coordinate values X21, X31, X23, X33, X41, and X43 at T21, T31, T23, T33, T41, and T43. The maximum value of the Y coordinate values is the coordinate values Y21 and Y22 at T21 and T22, and the minimum value of the Y coordinate values is the coordinate values Y43 and Y44 at T43 and T44.

After selecting the maximum value Xmax and the minimum value Xmin of the X coordinate values and the maximum value Ymax and the minimum value Ymin of the Y coordinate values, the parking assistance device 100 sets a search range W based on the selected four coordinate values. As illustrated in FIG. 12, the search range W is a rectangular range defined by the four sides: E1, E2, E3, and E4.

E1 is a line segment that is in parallel with the X axis and the intersection point of which with the Y axis has a Y coordinate value of Y21 or Y22.

E2 is a line segment that is in parallel with the X axis and the intersection point of which with the Y axis has a Y coordinate value of Y43 or Y44.

E3 is a line segment that is in parallel with the Y axis and the intersection point of which with the X axis has an X coordinate value of X4.

E4 is a line segment that is in parallel with the Y axis and the intersection point of which with the X axis has an X coordinate value of T21, T31, T23, T33, T41, or T43.

Second Embodiment

Figure 13:
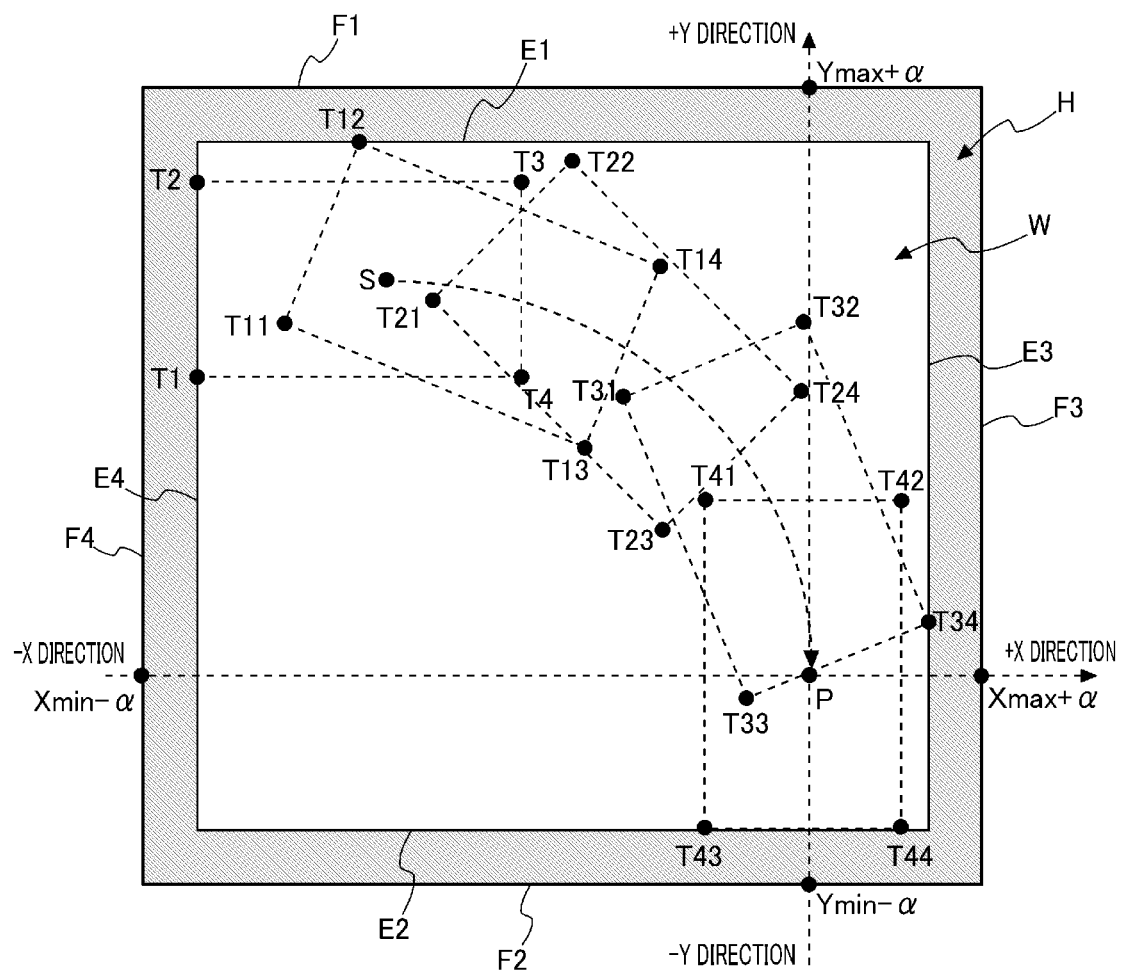
FIG. 13 is a diagram illustrating a notification range.

A second embodiment of the present invention will be described with reference to FIGS. 13 and 14.

A parking assistance device 100 of the second embodiment has the same configuration as that of the first embodiment, and thus detailed description of the configuration of the parking assistance device 100 is omitted.

The parking assistance device 100 of the second embodiment sets a notification range H on the outside of the search range W. FIG. 13 is a diagram illustrating a notification range H. The hatched range in FIG. 13 is the notification range H.

After setting the search range W, the parking assistance device 100 sets the notification range H on the outside of the search range W. The notification range H is set by adding a preset set value to the maximum value Xmax and the minimum value Xmin of the X coordinate values and the maximum value Ymax and the minimum value Ymin of the Y coordinate values selected when the search range W is set. In the following description, this set value is represented by α (α is an arbitrary natural number).

The inner side of the notification range H is defined by the four sides E1, E2, E3, and E4 of the search range W, and the outer side of the notification range H is defined by four sides: a first side F1, a second side F2, a third side F3, and a fourth side F4.

The first side F1 has a Y coordinate value of Ymax+α and is in parallel with the X axis.

The second side F2 has a Y coordinate value of Ymin−α and is in parallel with the X axis.

The third side F3 has an X coordinate value of Xmax+α and is parallel with the Y axis.

The fourth side F4 has an X coordinate value of Xmin−α and is parallel with the Y axis.

In the notification range H, the range X1 on the +X axis side is expressed as Xmax <X1 Xmax +α, and the range X2 on the −X axis side is expressed as Xmin −α≤X2<Xmin. In the notification range H, the range Y1 on the +Y axis side is expressed as Ymax<Y1≤Ymax+α, and the range Y2 on the −Y axis side is expressed as Ymin−α≤Y2<Ymin.

Figure 14:
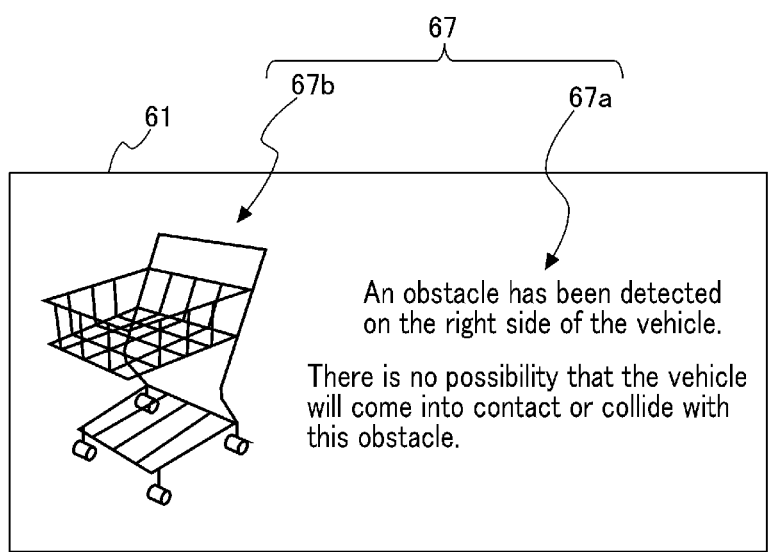
FIG. 14 is a diagram illustrating an example of a guidance display displayed on a display device.

FIG. 14 is a diagram illustrating an example of a guidance display displayed on the display device 60.

When an obstacle is detected in the notification range H, the parking assistance device 100 does not make judgment whether the host vehicle 1A will come into contact with or collide with this obstacle but makes the display device 60 display guide information 67. This guide information 67 includes the direction of the detected obstacle viewed from the driver sitting in the driver's seat of the host vehicle 1A, and guidance 67a showing information that there is no possibility that the host vehicle 1A will come into contact with or collide with this detected obstacle and other information. In addition, the guide information 67 may include an image 67b of the obstacle detected within the notification range H, captured by the image capturing unit 30.

The parking assistance device 100 of the second embodiment includes the display control unit 138 that makes the display device 60 display images, the display device 60 being connected to the parking assistance device 100 via the input-output interface 110.

The range setting unit 136 sets the notification range H on the outside of the search range W.

In the case in which a detected object is positioned outside the search range W and within the notification range H, the display control unit 138 makes the display device 60 display guide information 67 showing that the detected object will not interfere with the movement of the host vehicle 1A.

Thus, it is possible to provide the occupants a sense of security by notifying them that the object has been detected, and that the object will not interfere with the host vehicle 1A when the host vehicle 1A moves to the parking position P.

The foregoing embodiments are just examples of some aspects of the present invention, and thus, the embodiments can be modified or applied arbitrarily within the scope not departing from the gist of the present invention.

For example, in the first and second embodiments described above, the vehicle-width direction of the host vehicle 1A parked at the parking position P is set as the X axis, the vehicle-longitudinal direction of the host vehicle 1A in the same state is set as the Y axis, and the movement range of the host vehicle 1A in these two directions are calculated.

Figure 15:
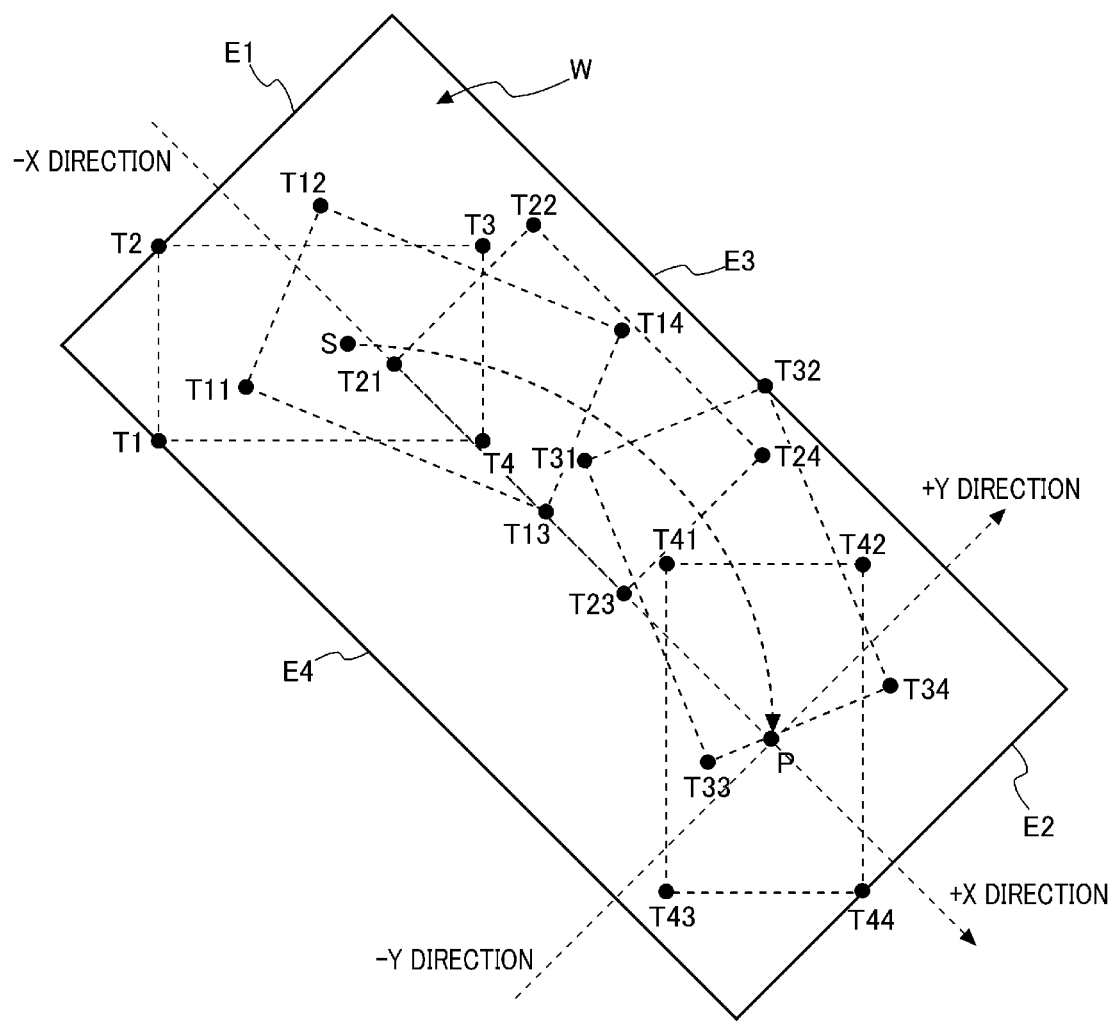
FIG. 15 is a diagram illustrating a search range for the case in which an X axis and a Y axis are rotated clockwise by 45 degrees.

FIG. 15 illustrates a case in which the X axis and the Y axis are rotated clockwise by 45 degrees from the X axis set in the vehicle-width direction and the Y axis set in the vehicle-longitudinal direction, illustrated in FIG. 9. As in this example, the two directions for calculating the movement range of the host vehicle 1A are not limited to the vehicle-width direction and the vehicle-longitudinal direction of the host vehicle 1A parked at the parking position P, but the two directions can be set in any directions.

In addition, although in the search range W illustrated in FIGS. 9, 11, 12, and 15, the parking position P is set as the origin of the X coordinate and the Y coordinate, the position of the origin is not limited to the parking position P. For example, the origin may be set to the initial position S, or the origin may be set to one of the division points D.

Although in FIGS. 9, 11, 12, and 15, the search range W is set using a coordinate system having two axes, the X axis and the Y axis, orthogonal to each other, the coordinate system does not have to be an orthogonal coordinate system.

In addition, the block diagram illustrating the configuration of the parking assistance device 100 in FIG. 1 is a schematic diagram in which the constituents are defined by classification according to the main processes, to make it easy to understand the invention of the present application, and hence, the configuration of the parking assistance device 100 can be classified into a larger number of constituents according to the processes. Alternatively, the configuration can be classified such that one constituent executes more processes.

In addition, the parking assistance device 100 in FIG. 1 may have a configuration integrally including at least one of the position detection unit 10 and the detection device 20.

In the case of implementing the parking assistance method of the present invention by using a computer, the program that this computer executes may be stored in a recording medium or may be provided through a transmission medium that transmits this program. The recording medium may be a magnetic or optical recording medium or a semiconductor memory device. Specifically, examples of the recording medium include portable or fixed recording media such as a flexible disk, a hard disk drive (HDD), a Compact Disk Read Only Memory (CD-ROM), a DVD, a Blu-ray (registered trademark) Disc, a magneto-optical disk, a flash memory, and a card recording medium. The above recording medium may be a nonvolatile storage device such as ROM and an HDD included in the parking assistance device 100.

The process units in the flowchart illustrated in FIG. 10 are defined by division according to the main processes, to make it easy to understand the processes of the parking assistance device 100, and thus, the way of dividing the processes into process units and the names of the process units do not limit the present invention. The processes of the parking assistance device 100 may be divided into a larger number of process units according to the processes. The processes of the parking assistance device 100 may be divided such that one process unit includes more processes.

REFERENCE SIGNS LIST 1A vehicle
3 in-vehicle device 5 communication bus
10 position detection unit
20 detection device
30 image capturing unit
31 front camera
32 rear camera
33 left-side camera
34 right-side camera
40 sonar unit
50 wireless communication device
60 display device
63 touch sensor
65 touch panel
67 guide information
70 vehicle control unit
80 travel driving device
81 steering device
83 driving device
85 braking device
87 transmission device
100 parking assistance device
110 input-output interface
120 memory
130 processor
131 position obtaining unit
132 condition obtaining unit
133 surrounding-area map generation unit
134 parking-position determination unit
135 route generation unit
136 range setting unit
137 judgment unit
139 control-information generation unit
H notification range
P parking position
Q1 to Q5 rectangular shape
R1, R2, R3 parking route
S initial position
W search range

What is claimed is:

1. A parking assistance device comprising:
a processor;
an input-output interface connected to an external device; and
a memory,
wherein the processor includes:
a condition obtaining unit configured to obtain a surrounding condition around a vehicle via the input-output interface, the surrounding condition being detected by a detection device;
a parking-position determination unit configured to determine a parking position at which the vehicle is to be parked, based on the obtained surrounding condition around the vehicle;
a route generation unit configured to generate a parking route along which the vehicle is to be moved to the parking position;
a range setting unit configured to calculate a movement range of the vehicle for a case in which the vehicle is moved along the parking route, in terms of a first direction and a second direction orthogonal to the first direction and that sets a search range for searching for an obstacle, based on the calculated movement range in the first direction and the second direction; and
a judgment unit configured
to detect an object that has a possibility of interfering with the movement of the vehicle, based on the obtained surrounding condition around the vehicle, in a case in which the detected object is positioned within the search range, to judge whether the detected object is an obstacle that interferes with the movement of the vehicle along the parking route, and,
in a case in which the detected object is positioned outside the search range, not to make judgment whether the detected object is the obstacle.

2. The parking assistance device according to claim 1, wherein
the range setting unit sets a vehicle-width direction of the vehicle in a state in which the vehicle is at the parking position as the first direction and sets a vehicle-longitudinal direction of the vehicle in the state in which the vehicle is at the parking position as the second direction, and
the range setting unit sets, as the search range, a range defined by the movement range of the vehicle in the first direction and the movement range of the vehicle in the second direction.

3. The parking assistance device according to claim 1, wherein
the range setting unit sets a plurality of division points at intervals of a specified distance on the parking route,
the range setting unit calculates the coordinate values indicating the range of the vehicle in terms of the first direction and the second direction, assuming a case in which the vehicle is at each of the current position of the vehicle, the positions of the plurality of set division points, and the parking position, and
the range setting unit sets, as the search range, a rectangular range defined by the maximum value and minimum value of the coordinates of the first direction and the maximum value and minimum value of the coordinates of the second direction, out of the coordinate values calculated at all the positions.

4. The parking assistance device according to claim 1, wherein
in a case in which the judgment unit judges that the object is an obstacle that interferes with the movement of the vehicle along the parking route, the route generation unit generates again a parking route along which the vehicle is to be moved to the parking position, avoiding coming into contact with the obstacle.

5. The parking assistance device according to claim 1, wherein the processor further includes
a display control unit configured to make a display device display an image, the display device being connected to the parking assistance device via the input-output interface, wherein
the range setting unit sets a notification range on the outside of the search range, and
in a case in which the detected object is positioned outside the search range and within the notification range, the display control unit makes the display device display a guidance display indicating that the detected object does not interfere with the movement of the vehicle.

6. A parking assistance method performed by a parking assistance device including a processor; an input-output interface connected to an external device; and a memory, the parking assistance method comprising the steps of:
obtaining a detected surrounding condition around a vehicle;
determining a parking position at which the vehicle is to be parked, based on the obtained surrounding condition around the vehicle;

generating a parking route along which the vehicle is to be moved to the parking position;

calculating a movement range of the vehicle for a case in which the vehicle is moved along the parking route, in terms of a first direction and a second direction orthogonal to the first direction, and setting a search range for searching for an obstacle based on the calculated movement range in the first direction and the second direction;

detecting an object that has a possibility of interfering with the movement of the vehicle, based on the obtained surrounding condition around the vehicle; and in a case in which the detected object is positioned within the search range, judging whether the detected object is an obstacle that interferes with the movement of the vehicle along the parking route, and in a case in which the detected object is positioned outside the search range, not making judgment whether the detected object is the obstacle.

* * * * *